UNITED STATES PATENT OFFICE.

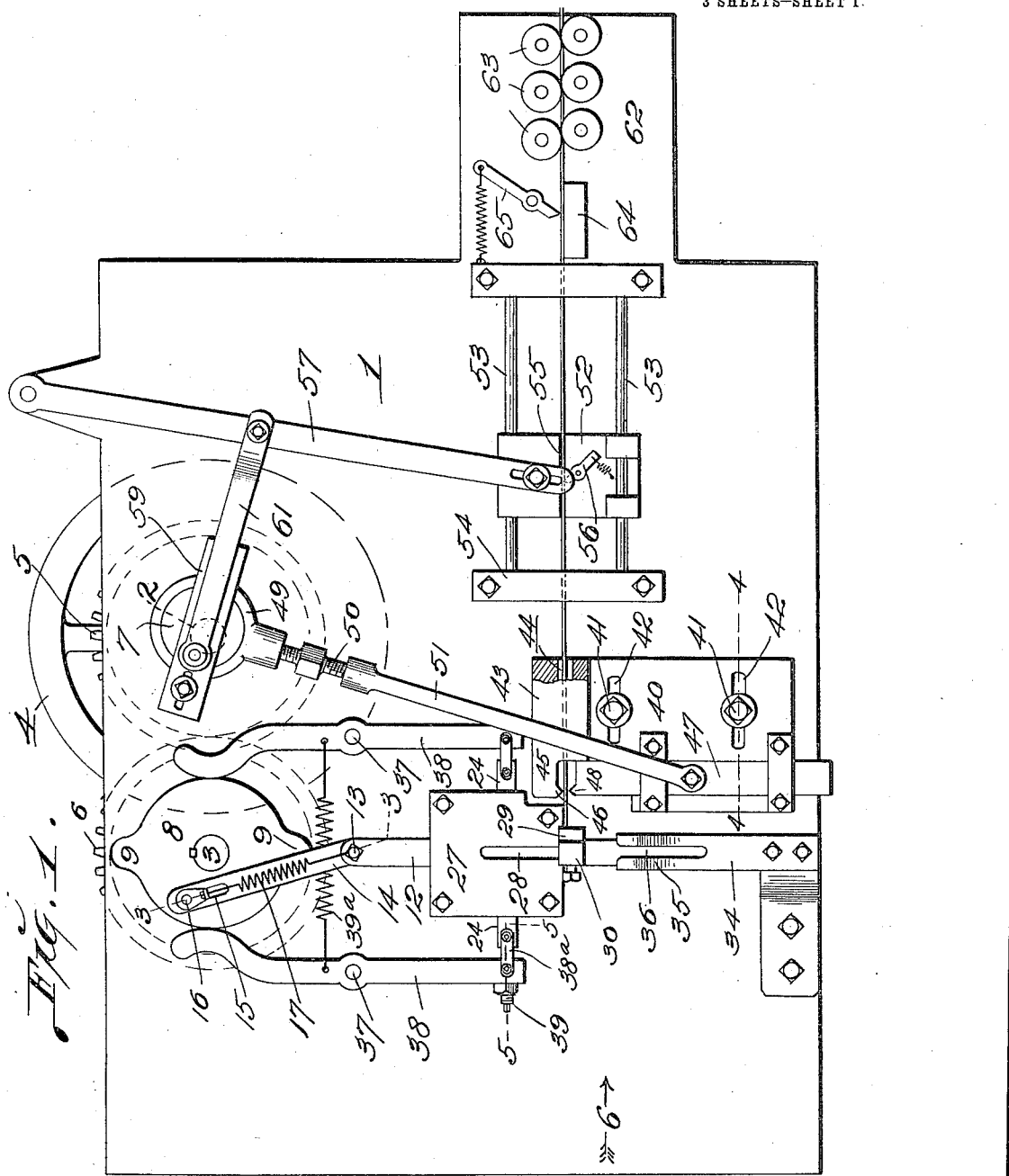

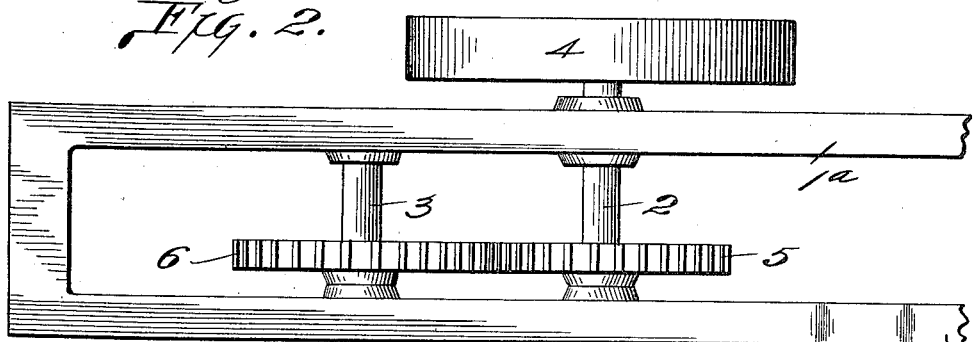
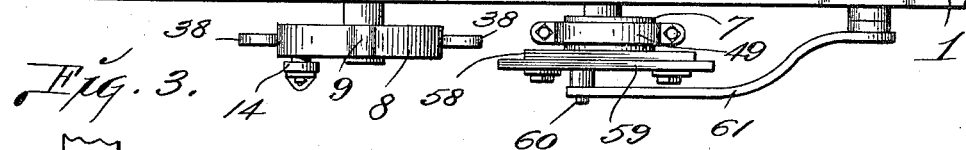
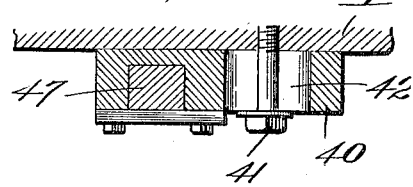
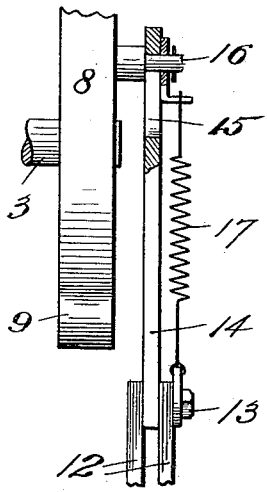
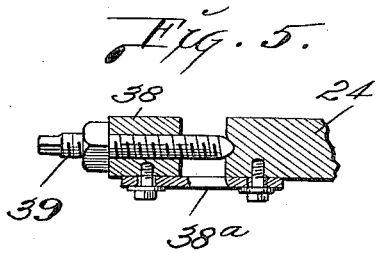

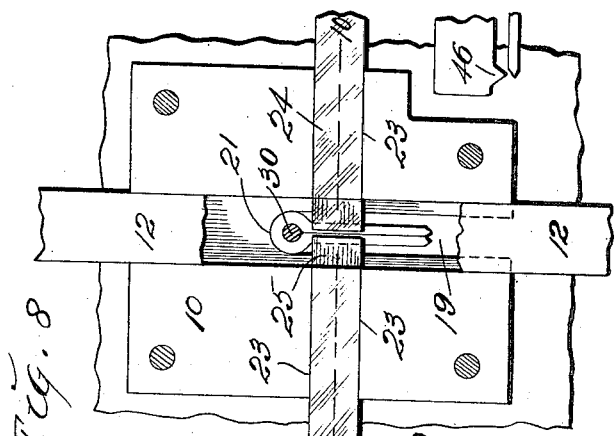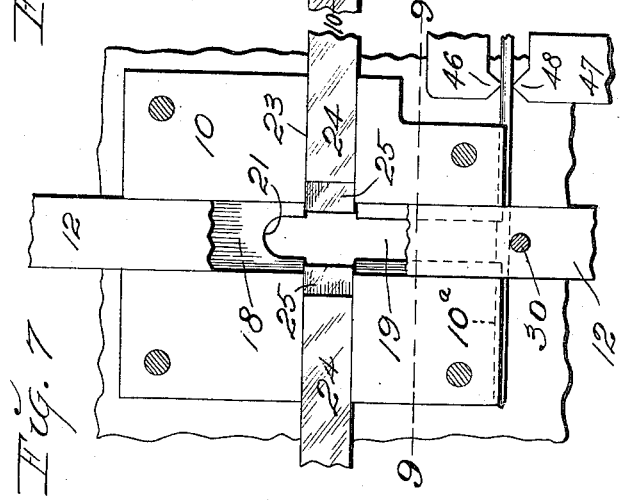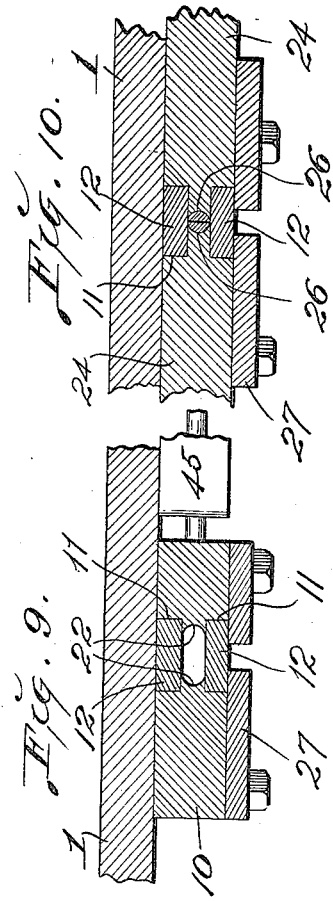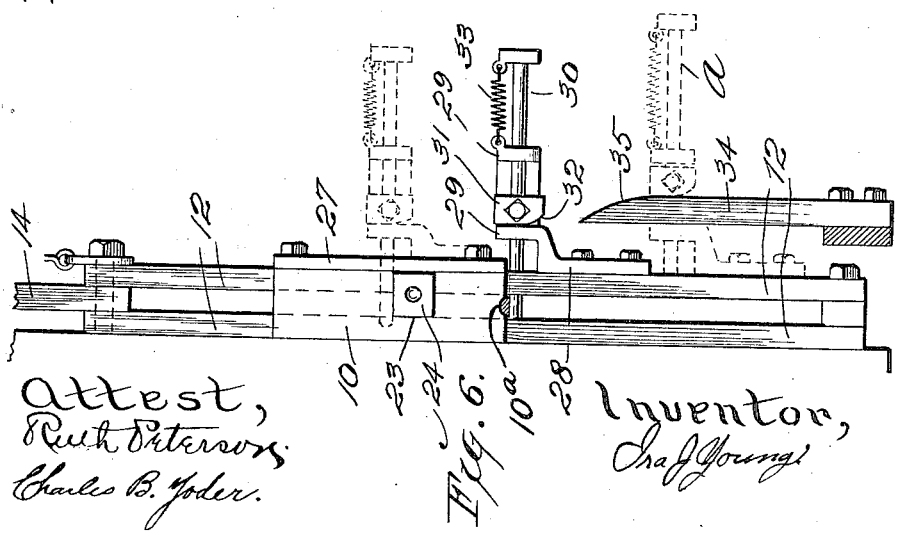

IRA J. YOUNG, OF ST. LOUIS, MISSOURI, ASSIGNOR TO WESTERN WIRE PRODUCTS COMPANY, OF ST. LOUIS, MISSOURI, A CORPORATION OF MISSOURI.

MACHINE FOR FORMING SPLIT PINS OR COTTER-PINS.

1,106,484. Specification of Letters Patent. Patented Aug. 11, 1914.

Application filed August 17, 1912. Serial No. 715,559.

*To all whom it may concern:*

Be it known that I, IRA J. YOUNG, a citizen of the United States, residing at St. Louis, Missouri, have invented certain new and useful Improvements in Machines for Forming Split Pins or Cotter-Pins, of which the following is a full, clear, and exact description, reference being had to the accompanying drawings, forming a part hereof.

My invention relates particularly to a machine designed for cutting wire into sections of uniform size and forming said sections into split pins or cotter pins, the same comprising a pair of parallel legs united at one end by a loop or eye, and the principal objects of my invention are to provide a comparatively simple, inexpensive machine which can be operated with little power, and to provide forming means which will readily produce a loop or eye in the center of a length of wire and which forming means also engages the wire immediately adjacent said loop or eye and exerts pressure thereon to form the necks between the loop or eye and the legs, which pressure is equal on both sides, thereby forming a pin with a perfect eye and with parallel legs that lie immediately adjacent each other in order that the pin may be readily introduced into the pin hole or opening.

Figure 1 is a front elevational view of my improved machine. Fig. 2 is a plan view of the machine, with parts thereof broken away. Fig. 3 is an enlarged vertical section taken on the line 3—3 of Fig. 1. Fig. 4 is a horizontal section taken on the line 4—4 of Fig. 1. Fig. 5 is an enlarged section taken on the line 5—5 of Fig. 4. Fig. 6 is an enlarged elevational view of the parts seen looking in the direction indicated by the arrow 6, Fig. 1. Fig. 7 is an elevational view of the forming means, with the cover plate thereof removed. Fig. 8 is an elevational view similar to Fig. 7, and showing the forming means engaging a section of wire to shape the same into a split pin. Fig. 9 is a horizontal section taken on the line 9—9 of Fig. 7. Fig. 10 is a horizontal section taken on the line 10—10 of Fig. 8.

In the construction of my improved machine as shown, 1 and 1ª designate a pair of vertically disposed plates suitably framed together and formed in the upper portions of said plates are suitable bearings for a pair of shafts 2 and 3. The shaft 2 is the main driving shaft of the machine and is equipped with a combined fly wheel and pulley 4, that is adapted to receive a driving belt (not shown). Fixed on the shaft 2 is a gear wheel 5 that meshes with a corresponding gear wheel 6, which latter is fixed on the shaft 3. Fixed on the front end of the shaft 2 is an eccentric disk 7, and fixed on the front end of the shaft 3 is a disk 8 provided on its edge with a pair of oppositely disposed lugs 9.

The split pin forming means of my improved machine is located on the face of the plate 1 below the shaft 3, and said forming means includes a metal block 10 that is formed on or fixed to the plate 1. This block is provided in its front and rear faces with vertical grooves 11 through which operate parallel bars 12. Pivotally connected to the upper ends of these bars by means of a pin 13 is the lower end of a link 14, the upper end of which is provided with a slot 15 through which passes a wrist pin 16 that is seated in the disk 8. Connected in any suitable manner to the pin 16 is the upper end of a retractile coil spring 17, the lower end of which is attached to the pin 13. The normal tendency of this spring is to exert an upward pull on the bars 12, thereby elevating the link 14 with respect to the pin 16. The lower ends of the bars 12 are connected in any suitable manner. Formed in the web of metal 18 between the grooves 11 and extending upwardly from the bottom of the block 10 is a vertically disposed slot 19, the upper end of which is rounded, as designated by 21, to form a seat for the eye of the split pin as the same is formed, and the edges of this slot are grooved, as designated by 22, so as to properly hold the wire of which the split pin is formed as the same is drawn upwardly into the former. The underside of the block 10 is provided with a shallow groove 10ª that forms a seat for the length of wire fed into position beneath said block to be formed into the split pin. Formed through the block 10 and intersecting the grooves 11 and slot 19 is a horizontally disposed slot 23 in which operates a pair of forming fingers 24. Formed on the forward ends of these fingers are vertically disposed tongues 25 that are adapted to pass between the bars 12 and the front edges of these tongues are grooved vertically, as designated by 26, so as to snugly fit the wire from which the split pins are formed. The slot 23 is located so that the tongues on the forward ends of the forming fingers operating in said slot come together immediately below the seat 21, which arrangement is essential in the formation of the eye of the split pin. Detachably fixed on the front face of the block 10 is a plate 27 in which is formed a vertically disposed slot 28 that coincides with the slot 19. Fixed on the front one of the bars 12 is a bracket 28, provided with a pair of horizontally alined bearings 29, and arranged to slide therein is a forming pin or rod 30. The forward end of this pin passes through a suitably located aperture in the front one of the bars 12, and engages in a corresponding recess located in the rear one of said bars. Located on this pin between the bearings 29 is a block 31, the rear lower corner of which is beveled or cut away as designated by 32. Connected to the outer one of the bearings 29 and to the head of the pin 30 is a retractile coil spring 33, the normal tendency of which is to draw the forward end of the pin into the recess in the rear one of the bars 12. Fixed on a suitable support on the lower portion of the plate 1 is a vertically disposed arm 34, the upper end of the outer face of which is curved as designated by 35, and the upper end of this arm is vertically slotted, as designated by 36, to permit the pin 30 to move downwardly relative to said arm 35. Fulcrumed on pins 37 that are seated in the plate 1 above and to the sides of the block 10, are levers 38, the upper ends of which are curved inwardly and bear directly on the periphery of the disk 8. The lower ends of these levers are connected to the forming fingers 24 by means of links 38ª, and seated in the lower ends of said levers and bearing against the rear ends of said forming fingers are adjustable screws 39. Connecting the upper portions of the levers 38 is a retractile coil spring 39ª that normally holds the upper ends of said levers against the edge of the disk 8.

The mechanism for severing the wire into equal sized lengths will now be described.

Arranged on the front side of the plate 1 below and to the right of the forming mechanism, is a plate 40 which is horizontally adjustable by means of screws 41 passing through slots 42 in said plate, and formed on the upper portion of this plate is a lug 43 provided with an opening 44 through which the wire passes. Located on the upper left hand corner of this plate 40 is a projecting lug 45 provided on its underside with a V-shaped cutting lug 46. Arranged to slide vertically in suitable bearings on the left hand side of the plate 40 is a bar 47 provided on its upper end with an inverted V-shaped cutting member 48 that operates in conjunction with the member 46 to cut the wire. Mounted on the eccentric disk 7 is a strap 49, and adjustably connected thereto by means of a right and left hand screw 50 is a link 51, the lower end of which is pivotally mounted on a wrist pin carried by the bar 47, thus as the disk 7 rotates the bar 47 is reciprocated vertically.

The means for intermittently feeding forward the wire to be severed and formed into split pins includes a plate 52 that is arranged to slide upon a pair of horizontally disposed rods 53 carried by lugs 54 projecting from the front side of the plate 1, and formed on the central portion of this plate 52 is a horizontally disposed shoulder 55 against which the wire engages during its feeding movement. Pivotally mounted on the plate 52 beneath this shoulder is a spring held pawl 56, the point of which engages the wire to move the same forwardly as the plate 52 is moved toward the severing and forming mechanisms. A vertically disposed lever 57 is pivotally connected at its upper end to the top of the plate 1 and the lower end of this lever has a pin and slot connection with the plate 52. Fixed on the disk 7 is a plate 58 and adjustably mounted thereon is a second plate 59 provided with a trunnion 60, to which is pivotally connected one end of a link 61, the opposite end thereof being connected to the lever 57.

Mounted on an extension 62 on the right hand end of the plate 1 is a series of wire straightening rollers 63, and located on this extension to the left of said rollers is a lug 64 over which the wire travels during its forward feeding movement. Positioned above this lug 64 is a spring held pawl 65, the point of which engages the wire during its travel over the lug to hold said wire against reverse movement during the movement of the plate 52 toward the right hand.

The operation of my improved machine is as follows: A belt is applied to the wheel 4 and as the same is driven simultaneous rotary motion is imparted to the shafts 2 and 3. As the disk 7 is rotated, motion is imparted to the plates 58 and 59 and by means of the link 61, swinging motion is imparted to the lever 57. As a result, the plate 52 is reciprocated upon the rods 53 and during the movement of this plate toward the left hand the point of the pawl 56 engages the wire beneath the shoulder 55 and thus moves said wire toward the severing and forming means. During this forward feeding movement the wire being fed into the machine is straightened between the roller 62 and during the backward movement of the plate 52 the point of the pawl 56 rides over the surface of the wire, while the pawl 65 holds the wire against reverse movement. The left hand end of the wire after passing through the opening 44 in the lug 43 passes into the groove 10ª in the underside of the plate 10, as shown in Fig. 7. During this wire feeding in movement the bars 12 carrying the forming pin 30 have been at their lower limit of movement, as shown by dotted line a, Fig. 6. Immediately after the proper length of wire has been fed into position beneath the plate 10, the bars 12 and parts carried thereby are moved upward so that the forming pin 30 occupies a position immediately against the underside of the length of wire beneath the plate 10, as shown in Figs. 6 and 7. During the preceding movements the pin 16 occupies the lower end of the slot 15 by reason of the retractile power of the spring 17, and as soon as the forming pin engages against the center of the length of wire the continued movement of the disk 8 causes the pin 16 to traverse the slot 15, during which time the link 14 and bars 12 remain stationary and the spring 17 is being expanded. During this stationary period of the forming pin the bar 47 carrying the cutting lug 48 is being elevated by the action of the disk 7 on the strap 49, and as said cutting lug reaches its upward limit of movement it engages the length of wire against the opposite cutting lug 46, thus severing the wire and the length or piece to be formed into a split pin is held against the underside of the plate 10 by the stationary forming pin 30. When the pin 16 reaches the upper end of the slot 15, the link 14, bars 12, and forming pin 30 will be moved upwardly and as a result the length of wire will be bent double over the forming pin and in such condition said length of wire will be drawn upward through the slot 19 with the legs of said doubled length of wire engaging in the grooves 22. When the pin 30 reaches its upper limit of movement the center of the length of wire occupies the seat 21 at the upper end of the slot 19, and at this instant the lugs 9 on the disk 8 engage the upper ends of the levers 38, thereby moving said upper ends outwardly and consequently moving the lower ends of said levers inwardly. The screws 39 seated in the lower ends of said levers bear directly against the outer ends of the fingers 24, thereby forcing said fingers inwardly toward each other, and as a result the tongues 25 on the forward ends of said fingers engage the legs of the length of wire held in the slot 19 and force said legs toward each other so that the inner faces of said legs lie parallel with and immediately against each other, as seen in Fig. 8. The tongues 25 bear against those portions of the legs of the pin immediately adjacent to the eye or loop around the forming pin, thus forming sharp well defined neck portions between the legs and eye. As the pressure imparted to the fingers 24 is practically equal and said fingers are positioned and operate directly opposite each other, the result is the formation of a perfect split pin having parallel legs that fit snugly against each other, a perfect eye, and well formed abrupt shoulders between the legs and eye. Immediately after the lugs 9 leave the upper ends of the levers 38, the spring 39ª draws the upper ends of the levers toward the disk 8, thus moving the lower ends of said levers carrying the fingers 24 outwardly, and thus the forming tongues on said fingers are disengaged from the legs of the split pin just formed. The link 14 carrying the bars 12 now moves downwardly as the disk 8 continues to rotate, and thus the pin 30 carrying the formed split pin moves downwardly through the slot 19. Immediately after the pin 30 has moved into a position below the plate 10, the beveled rear corner 32 of the block 31 engages the curved face 35 of the arm 34 and as the downward movement continues the block and pin carried thereby are moved outwardly through the bearings 29 to the position shown by dotted lines a Fig. 6, thus withdrawing the forward end of the forming pin from the eye of the split pin and the latter is now free to discharge into a suitable receptacle.

A machine of my improved construction is very simple, can be operated with comparatively little power, and very rapidly performs the various operations necessary to form split pins. The screws 39 can be readily adjusted so as to regulate the limit of inward travel of the forming fingers. The length of the sections of wire to be formed into split pins can be accurately regulated by adjusting the plate 40 toward or away from the forming means and by adjusting the plate 59 on the plate 58 which regulates the distance of swinging movement of the arm 57, to which the feeding mechanism is attached. The groove 10ª in the underside of the plate 10 forms a seat for the severed length of wire to be formed into the split pin and said groove coincides with the grooves 22 so that the legs of the split pin are held in true alinement as the severed length of wire is drawn upward into the slot 19.

It will be readily understood that minor changes in the size, form and construction of the various parts of my improved split pin machine may be made and substituted for those herein shown and described without departing from the spirit of my invention, the scope of which is set forth in the appended claims.

I claim—

1. In a machine for forming split pins, a rigidly fixed slotted forming plate the underside of which is provided with a groove, means for feeding a predetermined section of wire into said groove, means for moving the section of wire into the slot in said plate and a pair of fingers arranged to slide through the forming plate for engaging the section of wire to bend the same tightly around the means which moves the section of wire into the slot.

2. In a machine for forming split pins, a rigidly fixed slotted forming plate in the underside of which is formed a curve, means for feeding a predetermined length of wire into said groove, means for moving said section of wire into the slot in said plate, and a pair of forming members adapted to engage said section of wire while in the slot and form an eye therein.

3. In a machine for forming split pins, a rigidly fixed slotted forming plate provided in its underside with a groove, means for feeding a predetermined section of wire into said groove, a pin adapted to traverse said slot and move the section of wire thereinto, and means for engaging said section of wire with pressure to form an eye around the pin.

4. In a machine for forming split pins, a rigidly fixed slotted forming plate provided in its underside with a groove, means for feeding a predetermined section of wire into said groove, a member adapted to engage the section of wire and move the same into the slot in the plate, a pair of forming members arranged to slide through the forming plate toward each other for engaging the section of wire to form an eye around the first mentioned member and means for actuating said forming member.

5. In a machine for forming split pins, a rigidly fixed slotted forming plate provided in its underside with a groove, means for feeding a predetermined section of wire into said groove, a pin adapted to traverse the slot in the plate and move the section of wire thereinto, a pair of forming fingers arranged to slide through the forming plate and adapted to engage the section of wire with pressure to form an eye around the pin, and means for effecting the withdrawal of the pin from the eye.

6. In a machine for forming split pins, a slotted forming plate provided in its underside with a groove, means for feeding the end portion of a length of wire into said groove, means for cutting off that portion of the wire which occupies the groove, means for successively engaging the severed sections of wire and moving the same into the slot in the plate, and means comprising a pair of forming fingers arranged to slide through the forming plate and coöperating with the wire engaging means for forming an eye in each section of wire.

7. In a machine for forming split pins, a slotted groove plate provided in its underside with a groove, means for feeding a length of wire into said forming means for severing said length of wire into severed sections, a pin adapted to successively engage the sections of wire and move the same into the slot in the plate, and means comprising a pair of forming fingers arranged for sliding movement through the forming plate and coöperating with said pin for engaging the sections of wire while the same are in the slot to form eyes around the pin.

8. In a machine for forming split pins, a stationary forming member provided in its underside with a groove adapted to receive a section of wire, a movable forming member adapted to engage the section of wire and move the same into the stationary forming member to bend said section of wire double, and means arranged to slide through the stationary forming member and coöperating with the movable forming member for forming an eye in the section of wire around said movable member.

9. In a machine for forming split pins, a stationary forming member provided in its underside with a groove, means for feeding a predetermined section of wire into said groove, a movable forming member adapted to engage the section of wire and move the same into the stationary forming member to bend said section of wire double, means arranged to slide through the stationary forming member and coöperating with the movable forming member for forming an eye in the section of wire around said movable member, and means comprising a fixed slotted finger for effecting a withdrawal of the movable forming member from the eye.

10. In a machine for forming split pins, a slotted forming plate provided in its underside with a groove, means for feeding a section of wire into said groove, a movable forming member adapted to engage the section of wire and move the same into the slot in the plate, whereby said section of wire is bent double, and a pair of oppositely disposed forming members arranged to slide through the forming plate and adapted to engage the legs of the doubled section of wire and form an eye around the movable forming member the wire engaging ends of which sliding forming members are grooved to provide seats for said wire.

11. In a machine for forming split pins, a slotted forming plate provided in its underside with a groove, means for feeding a section of wire into said groove, a movable forming member adapted to engage the section of wire and move the same into the slot in the plate, whereby said section of wire is bent double, a pair of oppositely disposed forming members arranged to slide through the slotted forming plate and adapted to engage the legs of the doubled section of wire and form an eye around the movable forming member the wire engaging ends of which sliding forming members are grooved to provide seats for said wire, and means comprising a fixed slotted finger for effecting the withdrawal of the pin from the eye.

12. In a machine of the class described, a slotted forming plate provided in its underside with a groove, means for feeding a length of wire into the groove in said forming plate, means for severing a section of the wire from the main body portion thereof, a movable forming member adapted to engage the severed section of wire and hold the same while the severing means is actuated, means for moving the movable forming member into the slot in the plate to bend the severed section of wire double, and means comprising a pair of forming fingers arranged to slide horizontally through the slotted forming plate and coöperating with said movable forming member for forming an eye at the bent end of the section of wire.

13. In a machine of the class described, a slotted forming plate, a forming pin adapted to engage a section of wire and move the same into the slot in the plate to bend the section of wire double, a pair of forming members arranged to slide horizontally through the slotted forming plate and adapted to coöperate with said pin to form an eye at the bent end of the section of wire, levers for actuating the pair of forming members adjustable connections between said members and the forming members, and means for simultaneously actuating said levers.

14. In a machine of the class described, a forming plate provided with a slot open at one end and provided with a seat at its closed end there being a groove formed in the underside of said forming plate, means for feeding a section of wire into said groove, a movable forming member adapted to engage the section of wire and move the same through the slot to bend said section of wire double and locate the bent end in the seat at the end of the slot, and forming means comprising a pair of fingers arranged for sliding movement through the forming plate, which fingers are adapted to engage the legs of the doubled section of wire with pressure to form an eye around the movable forming member.

15. In a machine of the class described, means for engaging a section of wire and bending the same double, a portion of which forming means is positioned between the legs of the doubled section of wire at the bent end thereof while said wire is being bent, means comprising a pair of sliding forming fingers adapted to engage the legs of the bent section of wire adjacent to the bent end thereof to form an eye around the interposed portion of the forming means, and means comprising a fixed slotted plate for effecting the withdrawal of the interposed portion of the forming means from the eye.

16. In a machine for forming split pins, a slotted plate, the inner edges of the slot in said plate being grooved, there being a groove formed in the underside of the slotted plate, which groove is adapted to receive a length of wire to be formed into a split pin, means for moving a length of wire into the slot in the plate and means for forming an eye in said length of wire while the same is in the slot.

In testimony whereof I hereunto affix my signature in the presence of two witnesses, this 15th day of August, 1912.

IRA J. YOUNG.

Witnesses:
RUTH PETERSON,
CHARLES B. YODER.

Copies of this patent may be obtained for five cents each, by addressing the "Commissioner of Patents, Washington, D. C."